United States Patent [19]

Dreger

[11] Patent Number: 5,020,954
[45] Date of Patent: Jun. 4, 1991

[54] SCREW DRIVING SOCKET

[75] Inventor: Geoffrey Dreger, Etobicoke, Canada

[73] Assignee: Intools, Limited, Ontario, Canada

[21] Appl. No.: 442,678

[22] Filed: Nov. 29, 1989

Related U.S. Application Data

[63] Continuation-in-part of Ser. No. 652,992, Sep. 21, 1984, abandoned, which is a continuation of Ser. No. 360,501, Mar. 22, 1982, abandoned, and a continuation-in-part of Ser. No. 740,682, Jun. 3, 1985, abandoned, which is a continuation-in-part of Ser. No. 652,992, Sep. 21, 1984, abandoned.

[30] Foreign Application Priority Data

Mar. 30, 1981 [GB] United Kingdom ............... 8109924

[51] Int. Cl.$^5$ ..................... F16B 35/00; F16B 23/00
[52] U.S. Cl. .................................. 411/403; 411/919; 411/410; 411/404
[58] Field of Search ............... 81/460, 461; 10/7, 26; 411/410, 403, 404, 919

[56] References Cited

U.S. PATENT DOCUMENTS

| | | | |
|---|---|---|---|
| 975,285 | 11/1910 | Robertson | 411/403 |
| 1,910,182 | 5/1933 | Robertson | 411/410 |
| 2,046,837 | 7/1936 | Phillips | 411/404 |
| 2,082,748 | 6/1937 | Brown | 411/410 |
| 2,173,707 | 9/1939 | Brown | 81/460 |
| 2,216,381 | 10/1940 | West et al. | 81/460 |
| 2,285,460 | 6/1942 | Portell | 411/404 |
| 2,285,461 | 7/1942 | Purtell | 81/460 |
| 2,859,782 | 11/1958 | Cummaro | 81/460 |
| 3,120,012 | 2/1964 | Muenchinger | 10/7 |
| 3,237,506 | 3/1966 | Muenchinger | 411/404 |
| 3,283,638 | 11/1966 | Ansingh | 411/410 |
| 3,728,892 | 4/1973 | Sangster | 10/26 |
| 3,972,083 | 8/1976 | Dreger | 10/7 |
| 4,089,357 | 5/1978 | Gill | 81/460 |

FOREIGN PATENT DOCUMENTS

| | | | |
|---|---|---|---|
| 1169277 | 6/1984 | Canada | 411/410 |
| 301580 | 12/1928 | United Kingdom | 81/460 |

*Primary Examiner*—Eric R. Nicholson
*Attorney, Agent, or Firm*—Watson, Cole, Grindle & Watson

[57] ABSTRACT

A combined socket is provided, whereby a screw can be driven either by a cross tipped Phillips type driver or by a square Robertson type driver. The wings of the socket have end walls that curve convexly to permit the end wall to be clear of the corner of the square, right down to the bottom of the end wall. The vertical side faces of the socket have portions inclined at different angles. The upper and lower portions are inclined respectively at a greater angle to the vertical and a smaller angle to the vertical as compared to the side faces of a conventional Robertson type socket allowing a Robertson type driver to contact the side faces part way along the faces.

21 Claims, 6 Drawing Sheets

SCREW DRIVING SOCKET

BACKGROUND OF THE INVENTION

1. Cross-related Inventions

This invention is a continuation-in-part application of application Ser. No. 652,992, filed Sept. 21, 1984, which is a continuation application of application Ser. No. 360,501, filed Mar. 22, 1982 and a continuation-in-part application of application Ser. No. 740,682, filed June 3, 1985, which is a continuation-in-part application of application Ser. No. 652,992, filed Sept. 21, 1984.

2. Field of the Invention

This invention relates to driving sockets for screws and to punches for making such driving sockets.

3. Related Art

It is known (from for example U.S. Pat. No. 2,082,748, issued to Brown) to provide a combined driving socket that accepts either a square driver or a cross-point driver. In such a socket, the square recess is defined by four nearly vertical faces, and the cross recess by four wings disposed diagonally across the corners of the square, the wings each being defined by a pair of nearly vertical side walls and an end wall.

The term "vertical" applies only when the axis of the screw is itself vertical, but is used throughout the specification for clearer definition. The expression "nearly vertical" "or substantially vertical" means that the faces and walls in question have a draft angle of up to five degrees to permit easy withdrawal of a punch, or of a driver, from the socket, but apart from that the faces are, in substance, vertical.

It is known that the sharp corners of a square socket can give rise to crack-producing stress concentrations. The sharp corner is undesirable also because the extreme corner of the punch that has to form the sharp corner quickly becomes dulled and rounded due to the intense wear pressure at that point, and once the corner is no longer sharply formed, then the square driver cannot pass fully down into the square socket.

It can be inferred from the aforesaid U.S. patent that in order for substantially the whole length of the end wall to be clear of the square corner, the end wall must slope very steeply. The disadvantage here is that the cross-point driver is now not of the standard cross-point form called the Phillips form. Its blade edges slope more steeply, and it is blunter, as the patent shows. It could also be inferred that substantially the whole length of the end wall may be kept clear of the square corner if the end wall is positioned a long way from the axis of the screw. In this case, even though the angle of the end wall may be correct for the Phillips driver, the size of the Phillips driver that will be needed for the combination socket is enormous compared with the size of the standard square driver, or Robertson driver, that the socket needs.

In Canadian Patent No. 1,169,277 there is disclosed a combined socket for both Robertson and Phillips drivers. The socket has conventional vertical side faces forming a square for the Robertson driver. The faces are inclined so that, as is well known, they are engaged by a Robertson driver at the top. For the Phillips driver four wings are provided extending diagonally from the corners. The wings have nearly vertical and parallel side walls and a curved end wall. The curved end wall enables a standard size Phillips screw driver to be used while still enabling a Robertson driver to fully engage the socket.

The provision of curved end walls also means that the Phillips drive contacts these end walls below the top of the socket. However, the Robertson driver still contacts the socket at the top thereof. This has a number of disadvantages. It means that the stress resulting from the torque applied by the driver is greatest at the top, and this can effectively reduce the maximum torque that can be applied. It is necessary for the top of the vertical side faces to be formed accurately. But, in manufacture, the part of the punch forming the corners between the top face and the upper parts of the vertical side faces tends to wear quickly, necessitating frequent changes of the punch.

At the present time, a large number of different techniques are used for producing Robertson drivers and screw sockets. A common problem with all known techniques is the necessity to maintain fairly tight tolerances on items that are mass-produced. Conventional drivers are so dimensioned to have sides that are more steeply sloped than sides of corresponding sockets. As a result, when properly dimensioned, the driver will engage a socket near the top of the socket. This can produce a desirable cling effect, which helps maintain a screw on the driver, prior to inserting the screw in a socket.

However, by having different angles between the driver and the recessed sides, problems can arise, due to poor tolerances. One can have insufficient penetration of the driver into the socket, resulting in insufficient torque application and/or premature wear of the driver. Alternatively, the driver might engage fully to the bottom, resulting in loose fit or wobble.

Another problem in known arrangements is poor tolerances resulting in the driver primarily engaging a socket at the corners. This can result from wear of the punch giving a large radius to the socket corners, or build up in the corners of a plated screw. In either case, the driver will engage primarily at the corners causing undesirable stress concentrations.

It is desirable in a combined socket for the part accommodating the Robertson driver to engage between the top and the bottom of the socket. The, maximum stresses will occur at this point, and it should be possible to transmit a greater torque. Further, the socket design should be such that the torque is transmitted by abutting faces or at least along nominal line contacts, rather than point contacts. This avoids excessive stress concentrations. Further the socket design should be such that it permits large tolerances of places corresponding to areas of greatest punch wear. This increases punch life.

SUMMARY OF THE INVENTION

It is an aim of the invention to provide a combined driving socket that accepts the standard Robertson driver of the size that is conventionally selected to the particular screw size, and that also accepts the standard Phillips driver of the size that is conventionally selected for that screw size, yet wherein the end wall of the wing of the socket is substantially clear of the corner of the square right down to the bottom of the end wall.

One aspect of the invention consists of a screw with a combined driving socket that accepts either or both a square, Robertson driver and a cross-point, Phillips driver. The socket having four nearly vertical faces that together define a square recess. Four wings are disposed across the corners of the square and the wings are defined each by a pair of nearly vertical side walls, and an end wall. The wings define a cross-shaped recess wherein a driver-engaging zone of the end wall of the wing slopes substantially at 26½ degrees to the vertical, and wherein the deepest zone of the end wall is nearly vertical.

The edges of the driving blades of a Phillips screw driver slope at a normal 26½ degrees. These edges rest on the driver-engaging zone of the end wall of the wing, which is sloped correspondingly. The corner of the square driver is substantially clear of the end wall of the wing right down to the bottom of the end wall, by virtue of the nearly vertical deepest zone of the end wall, in the invention, without the need for the wing to be a long way from the screw axis.

It is preferred, for reasons to be explained hereinafter, that the driver-engaging zone of the end wall of the wing does not extend right to the top of the end wall, but that there is a relieving zone between the driver-engaging zone and the surface into which the socket was punched.

It is also preferred that the end walls are smoothly curved such that the zones blend with each other to produce a convexly curved end wall.

According to another aspect of the invention, there is provided a screw having a combined driving socket adapted to receive individually both a square, Robertson driver, and a cross-point, Phillips driver, the Robertson and Phillips drivers being of standard sizes conventionally associated with the screw size, the combined driving socket comprising: four nearly vertical faces that together define a square recess adapted to receive a square, Robertson driver, with each of said four faces having an upper portion that is at a greater angle to the vertical than the side faces of conventional Robertson drivers and a lower portion that is at a smaller angle to the vertical than the side faces of a conventional Robertson driver, whereby in use a Robertson driver will engage the side walls part way along the side walls; and four wings disposed diagonally with respect to the square recess and extending outwardly from the corners of the square recess, each of the wings being defined by a pair of nearly vertical and generally parallel side walls and a curved end wall, each of which curved end walls is convex and has a deepest zone that is nearly vertical, a relieving zone adjacent to the top of the socket that is at an angle to the vertical substantially greater than 26½ degrees, and a driver-engaging zone intermediate the deepest and relieving zones, which driver-engaging zone is at an angle of substantially 26½ degrees to the vertical, whereby the wings define a cross-slot shaped recess adapted to receive a standard cross-point Phillips driver with the blades of the driver contacting the driver-engaging zone of the end walls, the profile of the cross-slot shaped recess permitting disengagement of the Phillips driver, and, when such a standard cross-point Phillips driver is at a small angle to the axis of the screw, the curved end walls enable positive engagement of that driver with its blades contacting the end walls of the wings.

The present invention thus provides a socket in which both Phillips and Robertson drivers can be received and engage the socket below the top. This enables high torques to be transmitted. Further such a configuration does not require tight tolerances. As the drivers do not engage at the corners of the sockets, where punches tend to wear rapidly, it is not so important that tight tolerances are maintained at the corners. It is expected that this should enable punch life to be extended.

The provision of wings at the corners of the Robertson socket eliminates any problems due to poor corner tolerances. The corners are now in the wings and there it is not so important to have tight tolerances. Thus, a Robertson driver can fully engage across four faces between the top and the bottom of the socket. For curved side walls, the contact is theoretically a line contact, although in practice there will be substantial areas in contact. Preferably each side wall includes a portion between the top and the bottom which is at the same angle as the sides of the driver, so that there is a uniform distribution of the stress. Such a design should be capable of absorbing poor tolerances while still enabling full engagement of both Robertson and Phillips drivers.

DETAILED DESCRIPTION OF THE PREFERRED EMBODIMENTS

Figure 1:
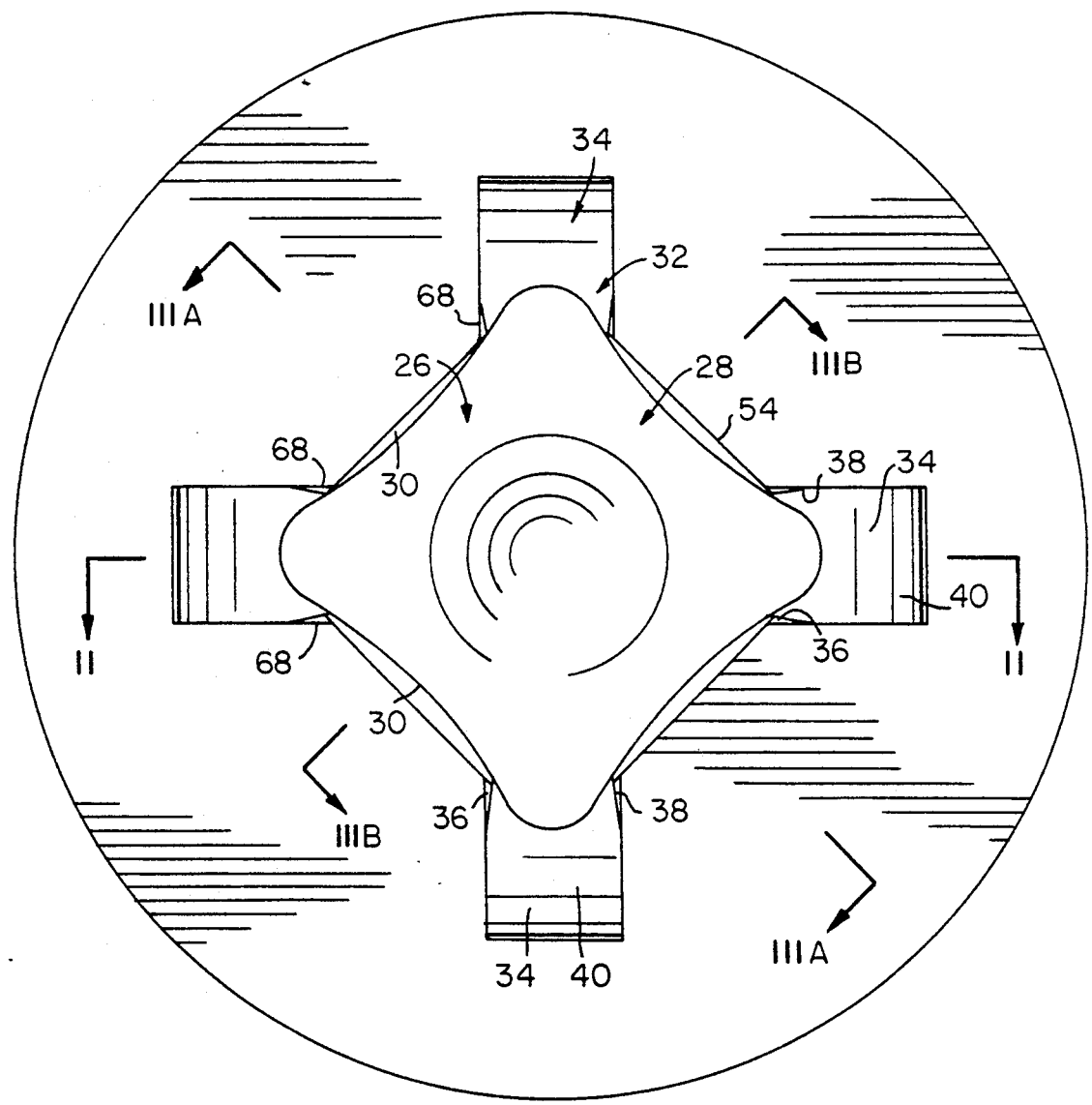
FIG. 1 is an enlarged plan view of a screw having a driving socket.
Figure 2:
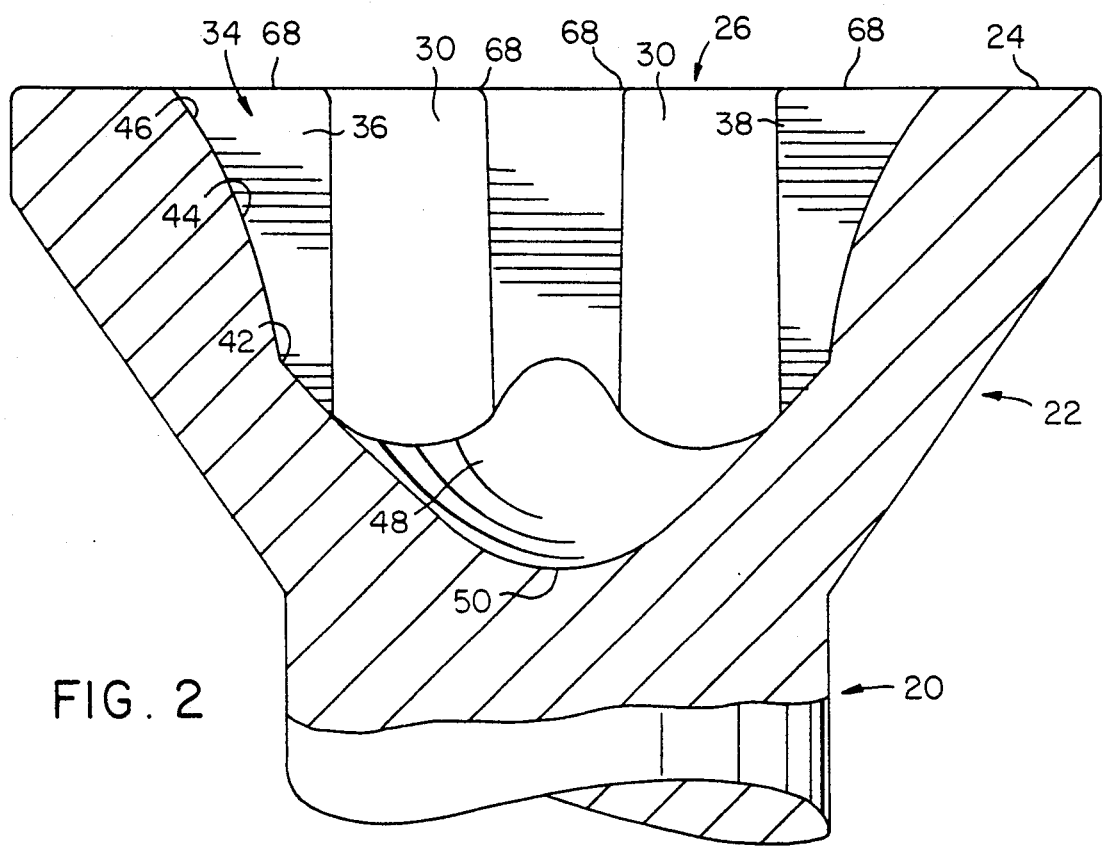
FIG. 2 is a sectional view along line II—II of FIG. 1.

FIGS. 1–3A, 3B, 4, 5A, 5B, 6A and 6B show a screw 20 having a countersunk head 22 which has an upper surface 24. Punched into the upper surface 24 is a driving socket 26. The socket 26 is specially adapted to receive both a Robertson driver or a Phillips driver conventionally associated with the screw size. For simplicity the figures show a screw having a countersunk head, it is to be appreciated that the present invention is equally applicable to a screw having any other shape of head.

The socket 26 includes a square recess 28 defined by four nearly vertical faces 30. As described in greater detail hereinafter the faces 30 taper inwards towards the bottom of the recess 28 and include portions that are at different angles to the vertical. The socket further includes a cross-shaped recess 32 which is integral with the recess 28. The recess 32 has four wings 34, which extend diagonally from the four corners of the square recess 28.

Each of the wings 34 has two generally vertical and parallel side walls 36, 38 and a respective end wall 40. The side walls 36, 38 are vertical except that they have a slight taper or draft to allow for free withdrawal of a punch die after punching. The end walls 40 of the wings 34 have a deepest zone 42, a driver-engaging zone 44, and a relieving zone 46. The deepest zone 42, driver-engaging zone 44 and relieving zone 46 are continuous with one another and with the vertical faces 30 of the square recess 28. Thus, the vertical faces 30 are not continuous with one another, and unlike conventional screw sockets, they do not extend right into the corners of the square recess 28. The deepest zone 42 is nearly vertical; the driver-engaging zone 44 slopes at an angle of substantially 26½ degrees to the vertical; and the relieving zone 46 slopes at an angle that is substantially greater than 26½ degrees. The end wall 40 is, in the case illustrated, a smooth convex curve, so that the three zones run into one another, without there being distinct boundaries between them.

The bottom 48 of the socket 26 is a core sloping at 45 degrees, with a rounded point 50. Such a cone follows the shape of the countersunk head 22.

Figure 5B:
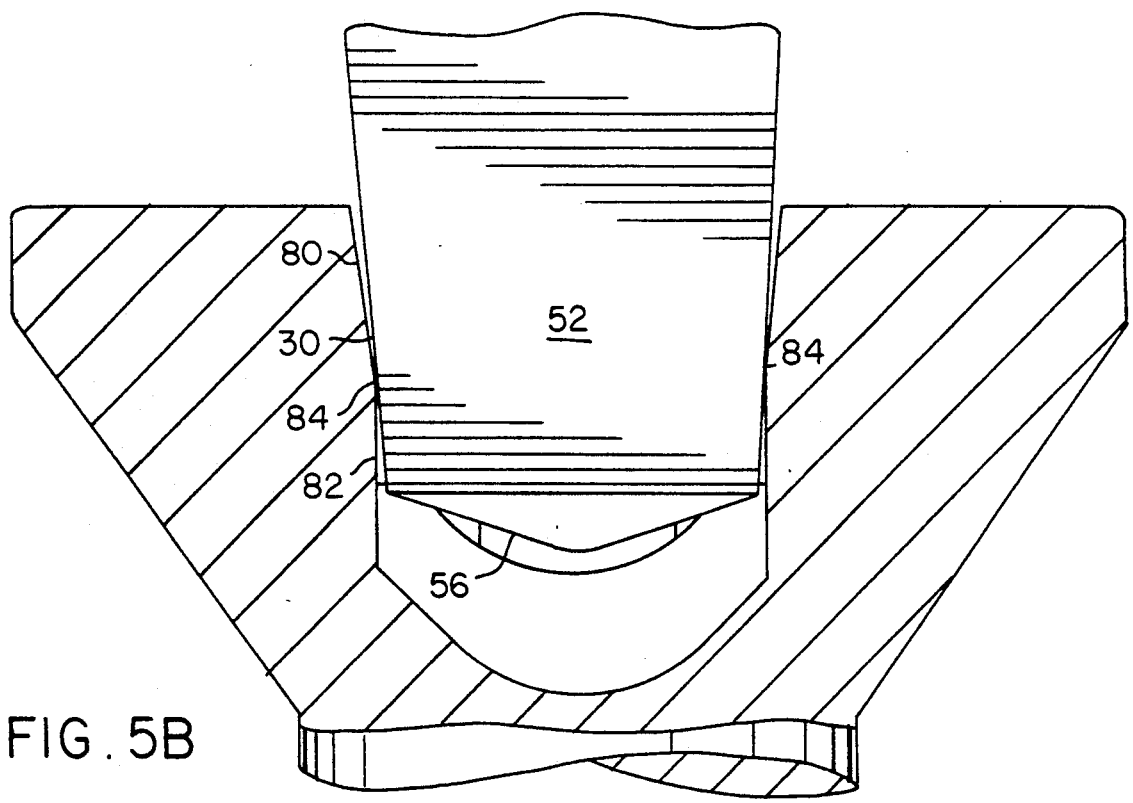
FIG. 5B is the same section as FIG. 3B with the same driver in the socket.
Figure 4:
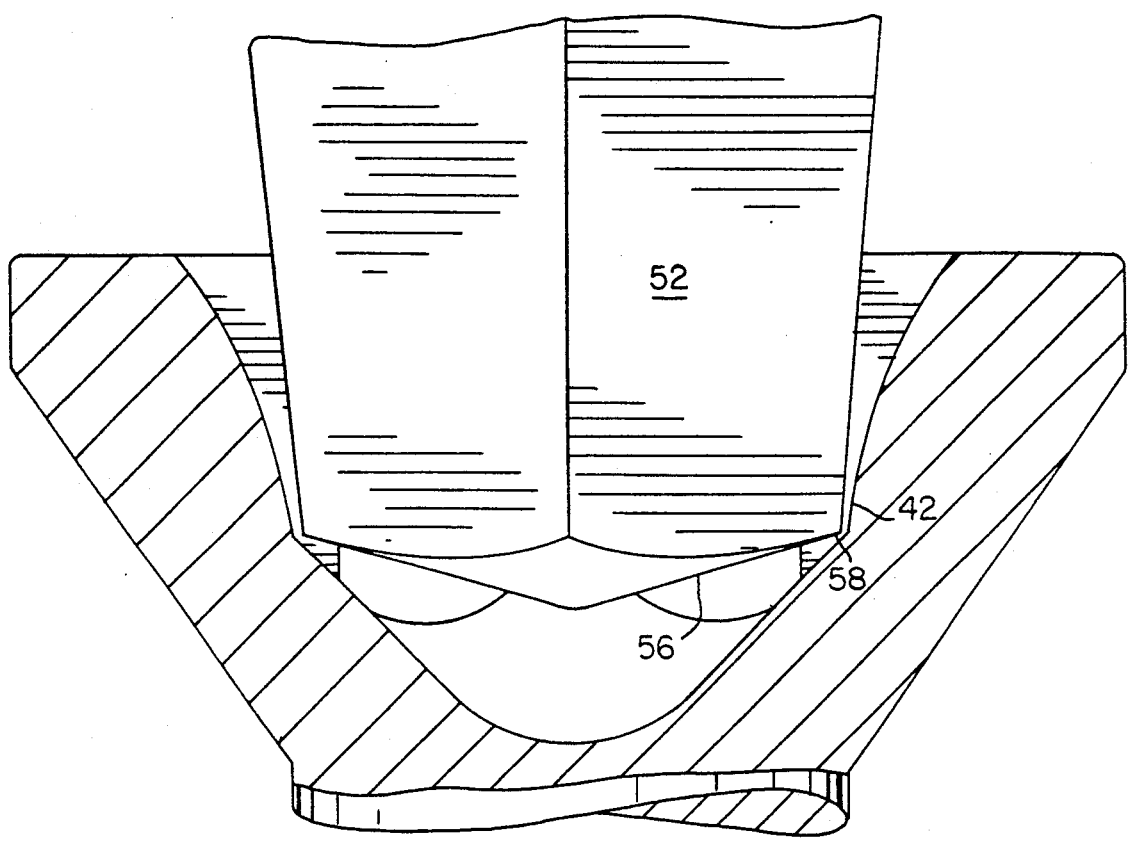
FIG. 4 is the same sectional view as that of FIG. 2, but shows a driver in the socket.
Figure 5A:
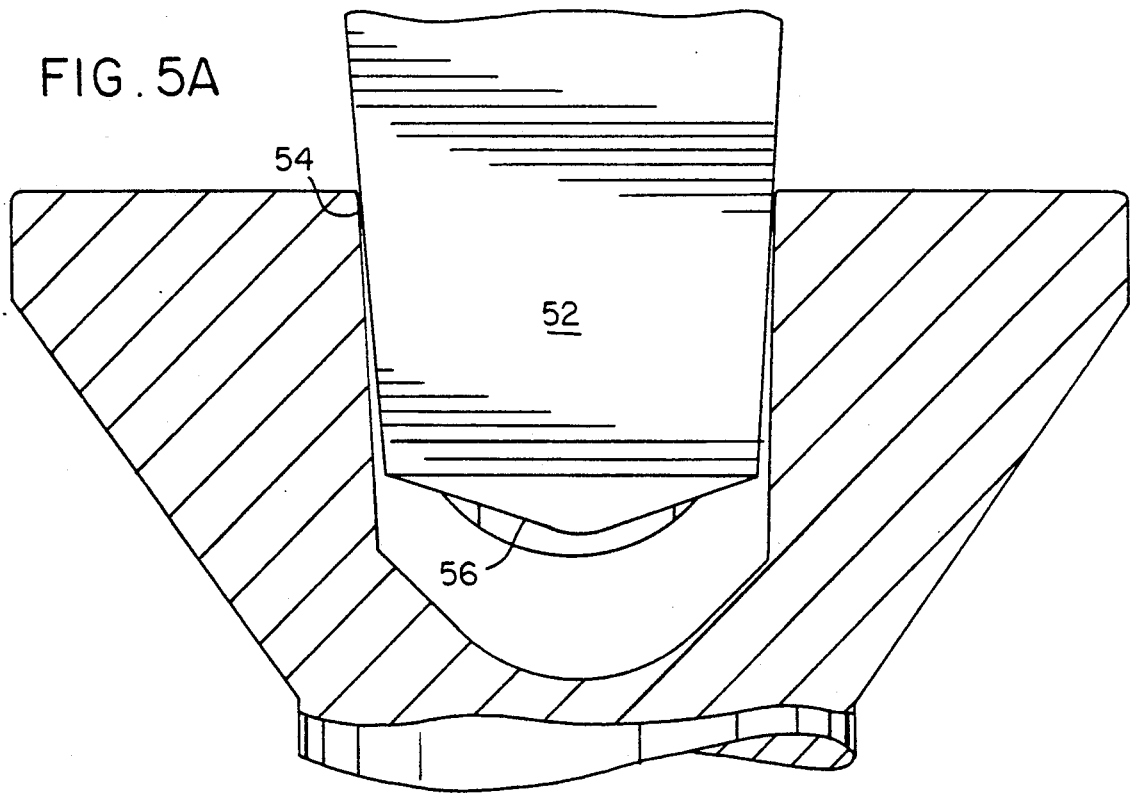
FIG. 5A is the same sectional view as that of FIG. 3A, but shows the same driver as in FIG. 4 in the socket.

FIG. 5A shows a standard square driver 52 fully engaged in the socket 26. The fully engaged position occurs when the flats on the driver touch the tops 54 of the faces 30, rather than when the bottom 56 of the driver touches the bottom 48 of the socket 26. FIG. 4 shows the driver 52 at the same depth from which it can be seen that the extreme corner 58 of the driver 52 is clear of the end wall 40 all the way down the end wall 40.

Figure 6B:
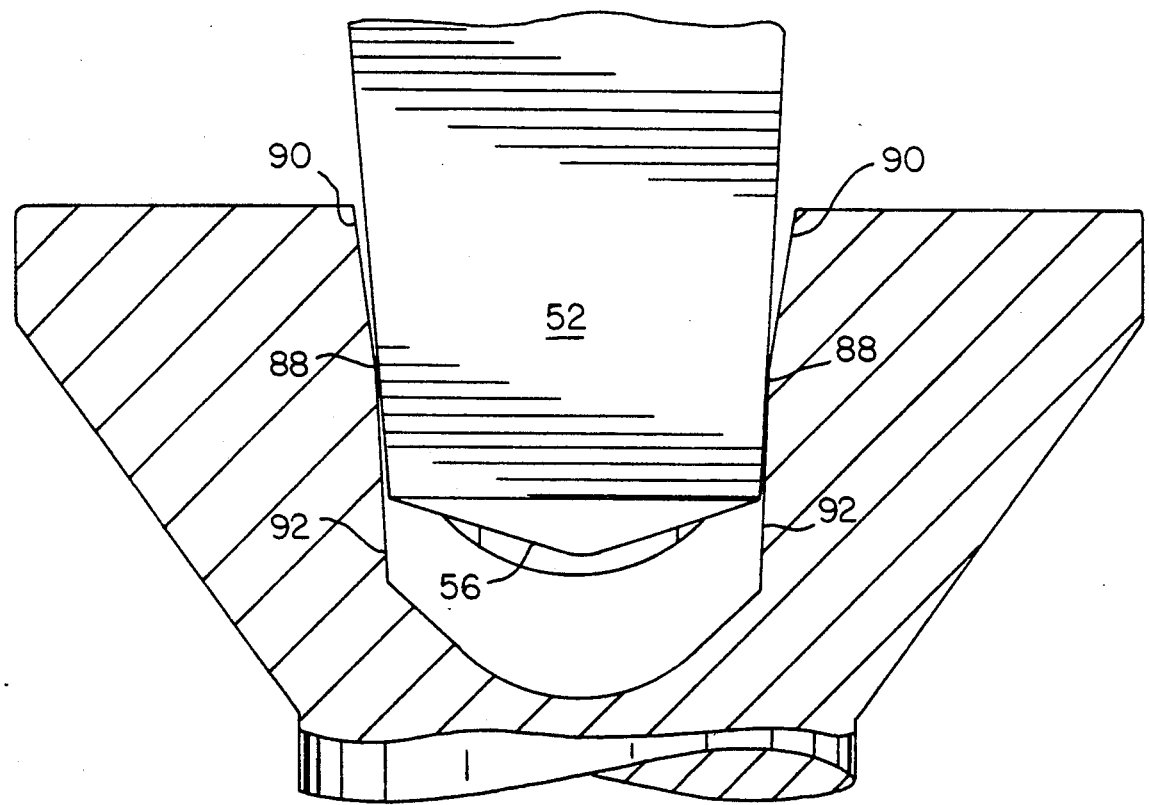
FIG. 6B shows a section similar to FIGS. 3B and 5B with the same driver in the socket.
Figure 6A:
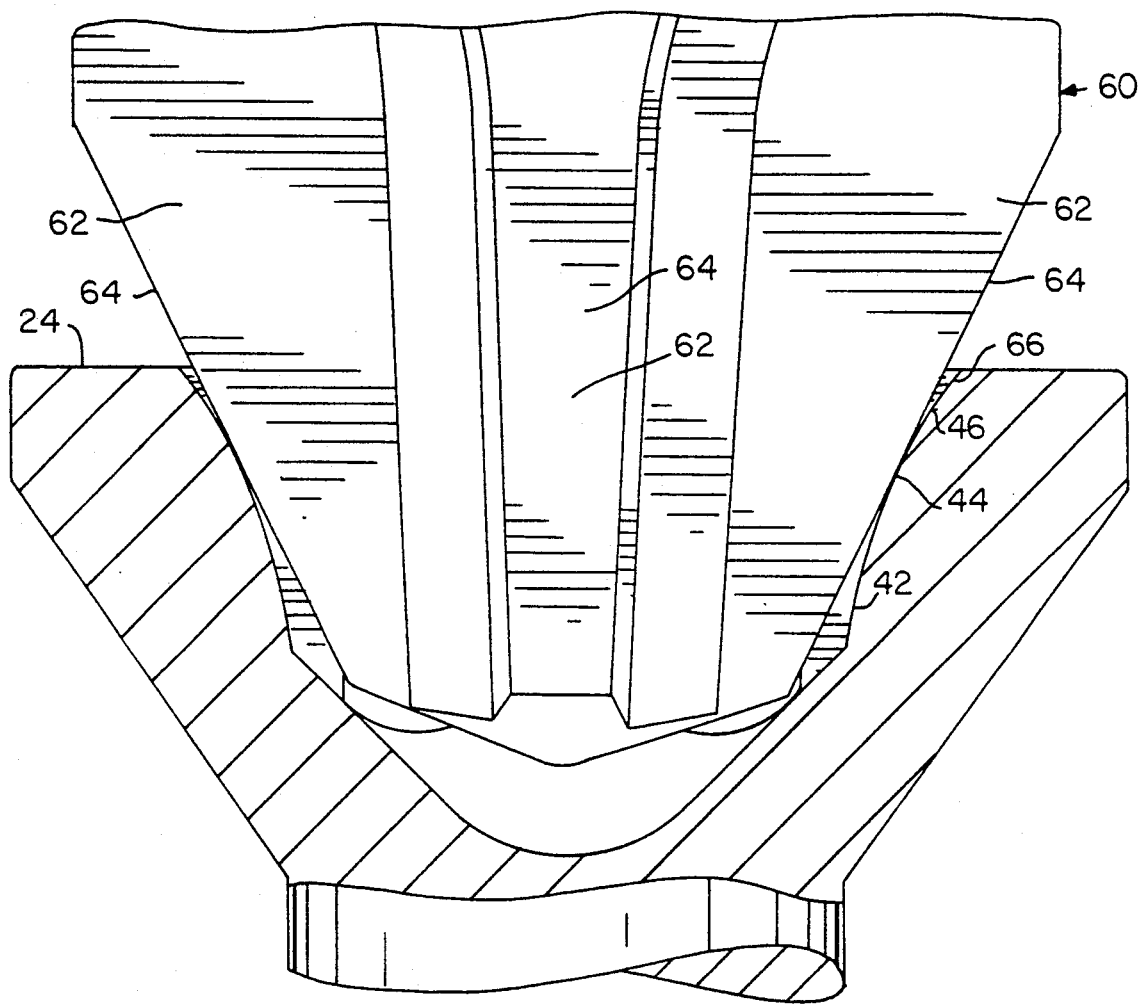
FIG. 6A is the same sectional view as that of FIGS. 2 and 4, but shows a different driver in the socket.

FIG. 6A shows a standard cross-point driver 56 engaged in the socket 26. The driver has four driving blades 62 each with an edge 64 that slopes at 26½ degrees to the vertical. It too does not touch the bottom 48 of the socket.

As can be seen from FIGS. 4, 5A and 6A, the square or Robertson driver and the cross-point or Phillips driver are both standard shapes and of a size that is conventional for the size of the screw. For instance, when the screw is a No. 8 screw, the square driver is a No. 2 Robertson driver, and the cross-point driver is a No. 2 Phillips driver, both of which are the conventional sizes for a No. 8 screw. Neither of the drivers touch the bottom of the socket (which if it occurred would produce a sloppy fit). Thus, with the invention, it is possible to provide a socket which receives either of both the appropriately-sized standard Robertson driver and the appropriately-sized standard Phillips driver. Furthermore, the end wall 40 of the wing 34 is quite clear of the corner 58 of the square, right down to the bottom of the wing 34. It should be noted that the socket will receive a standard Pozidriv screw driver of the appropriate size.

An advantage arising from the provision of the shaped end walls 40, as defined in the invention, is the ability of the socket 26 to receive a driving torque from a cross-point or Phillips driver 60 even though the driver is tipped. It can be seen from FIG. 6 that the fact that the lower zone 42 is remote from the edge 64 of the blade 62 of the cross-point driver 60 means that the driver 60 may be tipped quite appreciably and yet still be in contact with the driver-engaging zone 44. If the driver 60 is tipped to a very large extent, the edge 64 of course contacts the top 66 of the relieving zone 46, with very little driving torque being transmitted to the screw 20 as the driver 60 tends to cam out so easily.

Similarly, the remoteness of the deepest zones 42 means that the socket 26 can contain dirt or plating build-up, yet both of the drivers will still properly engage in the socket 26.

The provision of the relieving zone 46, which slopes at an angle greater than 26½ degrees, means that the cross-point driver 60 contacts the end wall 40 below the surface 24.

It is preferred that the edge 64 of the driver contacts the end wall 40 (in the driver-engaging zone 44) about two-thirds or three-quarters of the way up the end wall 40. If the driver is turned too vigorously, to the extent that it digs into the material of the screw 20, then the damage occurs below the surface 24, and any yielding of the screw material brings more material into contact with the driver 60. The advantage therefore arises that when the driver is turned too vigorously the tendency is for the resulting damage to be self-correcting, in that it does not spoil the fit of the driver in the socket. This should be contrasted with what happens if the driver 60 were to contact the very top edge 66 of the end wall 40. Any damage suffered now inevitably involves the removal of the sharp corner of the top edge 66, and a shallow angle at this edge increases the tendency of the driver to cam out. Thus, if the contact is at the top edge 66 of the end wall 40, rather than below the surface 24, over-vigorous turning of the driver 60 causes damage which tends to exacerbate the camming-out effect, not to correct it.

In the embodiment shown in FIGS. 3A, 4, 5A and 6A, the provision of the smoothly curved end wall means that the material of the screw flows smoothly around the punch with only a minimum of interference to that smooth flow. Thus the material can flow to the very top edges 68 of the side walls 36, 38 more easily than if the shape of the end wall 40 contained marked changes of section or direction. Since the material at these edges 68 arrived there by back flow during the punching process, the density of the material at the edges 68 can easily be low; a tendency which is kept to a minimum by the smoothly curved end wall 40. Thus, even if the driver 60 should contact the top edge 68, that edge is strong and hard and will resist damage.

If a Phillips screw driver is turned so hard in a screw socket that a failure occurs, the mode of failure is usually that the cross-slot is reamed out to a mere cone. If that happens the screw can neither be removed nor tightened except with great difficulty. The mode of failure with an overtightened Robertson driver however is usually that the screw shank breaks, i.e. the socket is not the weakest part of the screw. For mass production it is usually assessed that the Phillips failure mode is the better, since at least it does give a reliably tightened structural connection if failure occurs. The advantage of the invention is that the screw may be tightened to the point of destruction by reaming of the cross-slot part of the socket, but the square recess is left relatively unharmed, so that the screw may be removed subsequently with a square driver. The extra driving power of the square socket is normally a benefit of course, except in mass production, and even in mass production if control of the tightening torque can be relied on.

Figure 7:
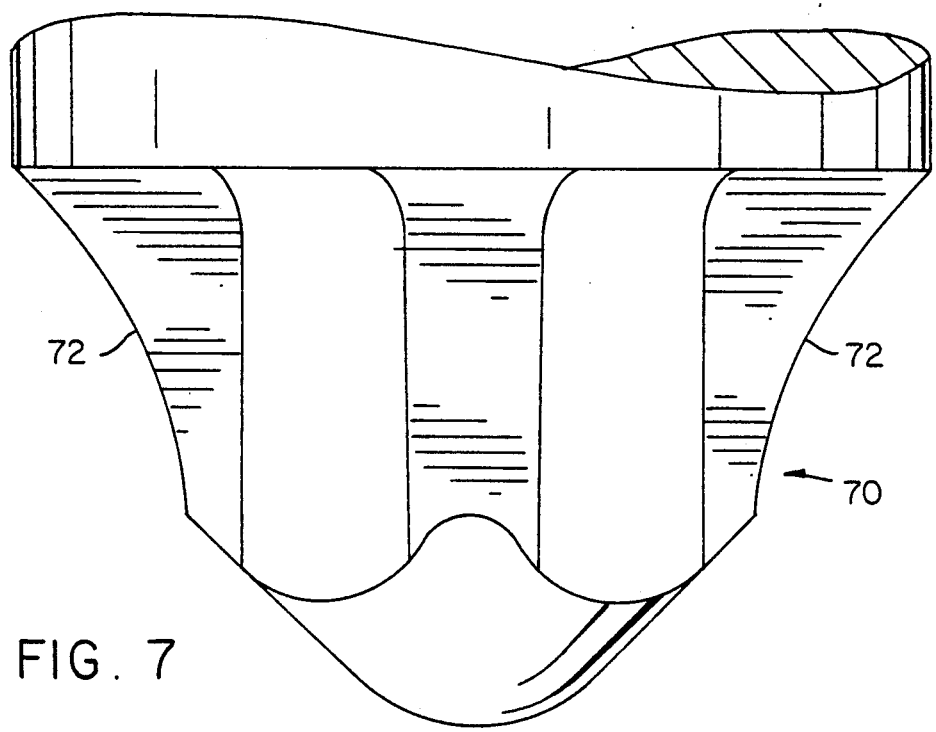
FIG. 7 is an enlarged elevation view of a punch.

The punch illustrated in FIG. 7 is a master punch and following the usual practice of making screw sockets, several female impressions are taken of the master, though not enough to damage it. These females are then used to produce batches of working punches, which actually punch the sockets in the screws. Both the master and the working punches have to be very hard, which means they can also be brittle. Any slight freeplay in the guides of the punching press can joggle the punch and cause it to snap if it is too brittle. The provision of the buttresses 72 on the punch, which form the wings 34, tends to strengthen the punch 70 and render it much less vulnerable to brittle fractures.

It is noted that the term "screw" as used in this specification is meant to be a broad one, and includes wood screws or self-tapping screws in which the threaded portion of the screw tapers to a point, or machine bolts in which the threaded portion is parallel and which terminates in a flat end. The screw may have a countersunk head, or a head of another configuration, or no head at all if it is a grub screw.

Figure 3A:
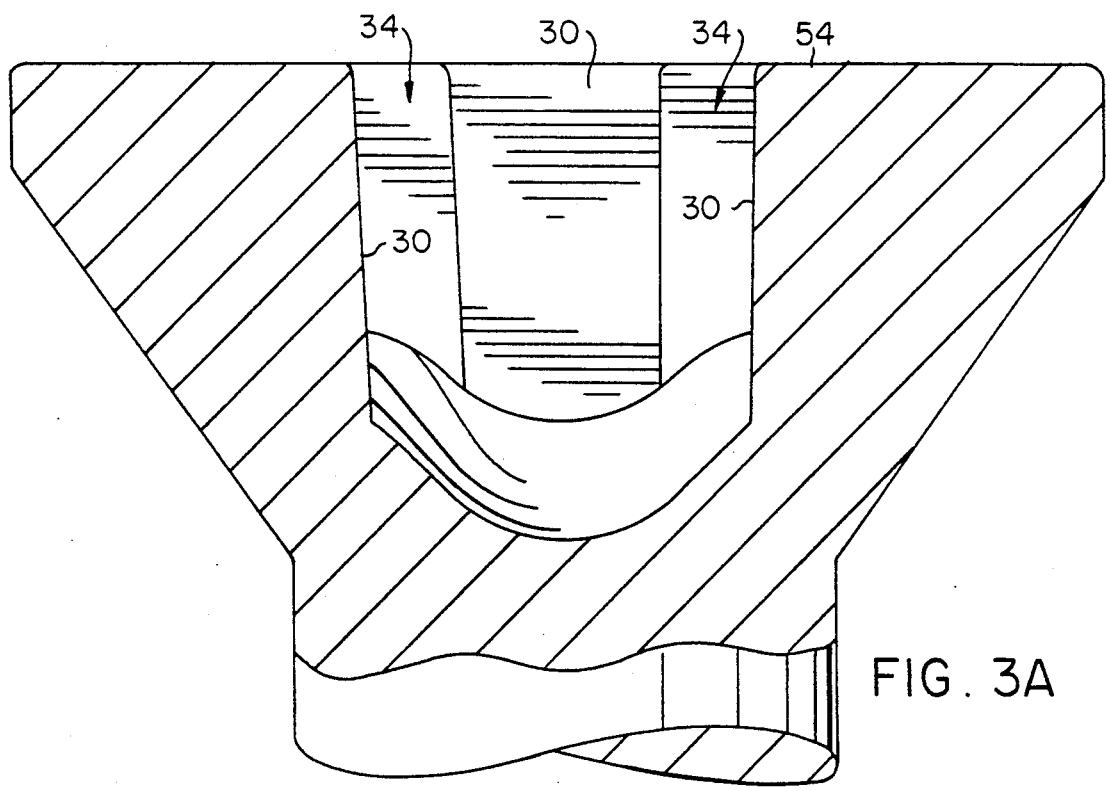
FIG. 3A is a sectional view along line IIIA—IIIA of FIG. 1.
Figure 3B:
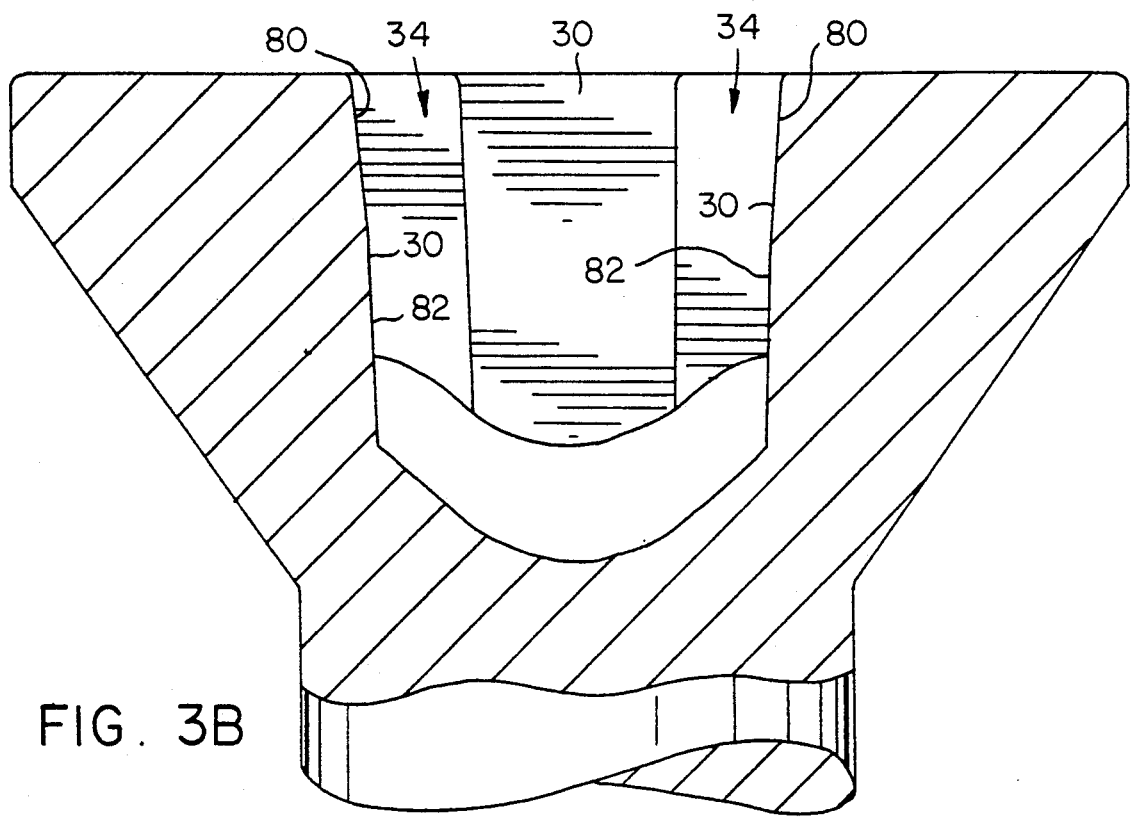
FIG. 3B is a sectional view along line IIIB—IIIB of FIG. 1.

Reference is now made to FIG. 3B, representing the second embodiment of the invention, which shows details of the square recess 28. Each of the vertical faces 30 comprises an upper portion 80 and a lower portion 82, which are of approximately equal height. The upper portion 80 is inclined at a relatively great angle to the vertical whereas the lower portion 82 is only inclined at a slight angle to the vertical. Conventional Robertson drivers have faces which are at an angle of 2½ to 3 degrees to the vertical. The upper and lower portions 80, 82 should have angles chosen so that a Robertson driver will engage the vertical faces 30 at the junctions between these upper and lower portions 80, 82. Consequently, the upper portion 80 is at an angle of greater than 3 degrees to the vertical, and a preferred maximum angle for the upper portion 80 is 5 degrees. Similarly, the lower portion 82 is at an angle to the vertical less than 3 degrees. The minimum angle for this lower portion 82 is 30', with a preferred tolerance on this dimension of plus or minus 15'.

The bottom profile is the same as described previously although other profiles may be adopted. The bottom profile should not prevent full penetration of either of the two drivers intended for the socket, and it should not weaken the screw head.

Referring now to FIGS. 4 and 5B, there is shown a standard square driver 52 of the Robertson type, fully engaged in the socket 26. As shown in FIG. 5B, the fully engaged position occurs when the sides of the driver 52 contact the junctions between the upper and lower portions 80, 82 of each face 30, these junctions being designated 84. Theoretically, there will be a line contact between each face 30 and the corresponding flat of the driver 52, but in practice, due to resilience and the small angle between the upper and lower portions 80, 82, a substantial area of each face 30 will contact the corresponding flat of the driver 52. As shown in FIG. 5B, the driver 52 is well clear of the bottom 48 when fully engaged. Also as shown in FIG. 4, when fully engaged, extreme corners 58 of the driver 52 are clear of the end walls 40 of the wings 34, for the full depth of the wings 34.

Conventionally, a Robertson driver wedges into a square socket having a smaller taper angle. This does have the advantage of producing a cling effect, so that a screw once mounted on a driver tends to remain on it, thus facilitating insertion of the screw into a socket. However, this has the disadvantage that the driving torque is applied near the upper surface of the screw. Even if the screw head is uniform, this does not apply the torque at the best part of the screw head. It is better that the stress resulting from the applied torque be applied below the top surface of the screw head. Also, due to back flow during the punching of the screw head, the material at the top surface might be of a lower density and weaker than the rest of the screw head.

In the recess 28 of the socket 26 of the present invention, the driver 52 contacts the vertical faces 30 at the junctions 84, below the top surface 24. Consequently loads applied to the screw head 22 are better applied to it. For the application of a clockwise torque to the screw, a compressive force will be applied at the ends of the junctions 84 indicated at 86 in FIG. 1. Thus, this compressive stress will be applied to the faces 30 at the ends 86 of the junction lines 84 which are close to the wings 34 and below the top surface 24. At this location the screw head 22 should be well able to absorb the compressive loads, while clinging to the driver.

With reference to FIG. 6B, there is shown another embodiment of the square recess 28, where instead of distinct upper and lower portions, the sides of the recess 88 curve uniformly. For each side face 88 an upper portion 90 is at an angle to the vertical of greater than 3 degrees, while a lower portion 92 is at an angle to the vertical of less than 3 degrees. These side faces 88 will thus behave similarly to the side faces 30 of the first embodiment. As shown in FIG. 6B when a standard square driver 52 is inserted, it will contact the faces 88 at the mid-points between the upper and lower portions 90, 92. Thus again the driver 52 will become wedged in the socket below the top surface thereof. It will again be clear of the wings 34 and the end walls 40 as shown in FIG. 4.

Many variations of the profile of the square recess 28 are possible. The essential requirement is that the upper portions of the vertical faces are at a greater angle to the vertical than the side faces of the corresponding square driver, while the lower portions of the side faces of the socket are at a smaller angle to the vertical. For example, although FIG. 5B shows side faces having two straight portions, as viewed in vertical section, each side face could be comprised of three or more straight sections. For example, each side face could include an intermediate section having an angle of 2½ to 3 degrees. Thus this intermediate section would be at the same angle as a conventional Robertson driver, to give a large surface area for contacting the driver, so as to distribute applied compressive loads. Furthermore, below this intermediate section, a further section could be provided having an angle of 2 degrees plus or minus 15' to give a total of four straight sections or portions. Where the side faces are curved, as viewed in vertical section, the radius should be chosen to give the desired angles at the top and the bottom.

In a preferred embodiment of the present invention, each side face has three portions, namely and upper or top portion having an angle to the vertical of between 3½ to 4 degrees, and in any event a maximum angle of 5 degrees; an intermediate section is arranged for contacting side faces of a standard Robertson driver with faces at 2½ to 3 degrees to the vertical. Thus the intermediate section has faces at an angle in the range of 2½ to 3 degrees. A bottom or clearance section has faces at an angle of less than 2 degrees but not less than 30'. The intermediate section extends for approximately 50% of the depth of the socket.

This arrangement of the different sections forming the profile of the square recess should give good driving characteristics. A driver will contact the walls of the intermediate section approximately uniformly for half the depth of the square recess 28. As a result the torque applied by a driver will be transmitted uniformly below the top of the socket. The bottom or clearance section is important. During manufacture of the screws the punch forming the bottom of the socket tends to wear rapidly. As a result the very bottom of the square recess 28 is likely to be incorrectly formed and to have smaller dimensions than those intended. By providing a clearance section at the bottom, these imperfections should not prevent a driver from fully engaging the intermediate section.

The profile of the socket 26, and the manner in which it engages the respective drivers, is tolerant of considerable imperfections. It is expected that it will not be necessary to adhere to the close tolerances often required for other screw socket designs. As discussed above, for both Robertson and Phillips screw drivers, the drivers contact the socket 26 well below the top surface 24. If there are any imperfections in the tolerances on the socket 26, then the point of engagement for the two drivers will simply be displaced slightly, without significantly effecting the engagement of the drivers. If there is excessive plate build-up, after plating of the screws, for example, then the drivers should still be able to engage the socket 26 properly, although they will not engage quite as deeply as for an accurately dimensioned screw. The remoteness of the zones 42 of the wings 34, and the suggested profile for the faces 30 of the square recess assist in containing dirt or plate build-up, while still enabling full engagement of the drivers.

What is claimed is:

1. A screw having a combined driving socket adapted to individually receive both a square, Robertson type driver and a cross-point Phillips type driver, the Robertson type and Phillips type drivers each being of standard sizes conventionally associated with the screw size, and the socket being shaped so that only parts of either a Robertson type or a Phillips type screw driver received in the socket contact sides of the socket to provide clearance between the socket and the driver, the combined driving socket comprising:
   four nearly vertical faces that together define a square recess adapted to receive a square, Robertson type driver;
   four wings disposed diagonally with respect to the square recess and extending outwardly from the corners of the square recess, each of the wings being defined by a pair of nearly vertical and generally parallel side walls and a curved end wall, each of said curved end walls being convex and having a deepest zone that is nearly vertical, a relieving zone adjacent the top of the socket that is at an angle to the vertical substantially greater than 26½ degrees, and a driver-engaging zone intermediate the deepest and the relieving zones, said driver-engaging zone being at an angle of substantially 26½ degrees to the vertical; and
   said wings defining a cross-slot shaped recess adapted to receive a cross-point Phillips type screw driver with the blades of the driver contacting the driver-engaging zones of the end walls, the profile of the cross-slot shaped recess permitting ready disengagement of the Phillips type driver, and when such a cross-point Phillips type driver is at an angle to the longitudinal axis of the screw, the curved end walls enable positive engagement of that driver with its blades contacting the driver-engaging zones in the end walls of the wings.

2. A screw as claimed in claim 1, wherein a bottom of the socket is rounded.

3. In combination, a screw as claimed in claim 1 and a Robertson type driver of the size associated with the screw for engagement in the square recess.

4. In combination, a screw as claimed in claim 1 and a Phillips type driver of the size associated with the screw for engagement with the cross-slot shaped recess.

5. In combination, a screw as claimed in claim 1 and a Robertson type driver of the size associated with the screw and a Phillips type driver of the size associated with the screw, with the Robertson type driver or the Phillips type driver respectively engagable with the square recess or the cross-shaped recess.

6. A punch shaped to punch a socket in the a screw as claimed in claim 1.

7. A screw having a combined driving socket adapted to individually receive a square Robertson type driver and a cross-point Phillips type driver, the Robertson and Phillips drivers each being of standard size conventionally associated with the screw size, the combined driving socket comprising:
   four nearly vertical faces that together define a square recess adapted to receive a square Robertson type driver with each of said four faces having an upper portion that is at a greater angle to the vertical than the side faces of a square Robertson type driver and a lower portion that is at a smaller angle to the vertical than the side faces of a square Robertson type driver, such that in use a square Robertson type driver will engage the side walls part way along the side walls;
   four wings disposed diagonally with respect to the square recess and extending outwardly from the corners of the square recess, each of said wings being defined by a pair of nearly vertical and generally parallel side walls and a curved end wall, each of said end walls being convex and having a deepest zone that is nearly vertical, a relieving zone adjacent the top of the socket that is at an angle to the vertical substantially greater than 26½ degrees, and a driver-engaging zone intermediate the deepest and relieving zones, said driver-engaging zone is at an angle of substantially 26½ degrees to the vertical; and
   said wings defining a cross slot shaped recess adapted to receive a cross-point Phillips type driver with the blades of the driver contacting the driver-engaging zones of the end walls, the profile of the cross-slot shaped recess permitting ready disengagement of the Phillips type driver, and when such a cross-point Phillips type driver is at an angle to the longitudinal axis of the screw, the curved end walls enable positive engagement of that driver with its blades contacting the driver-engaging zones in the end walls of the wings.

8. A screw as claimed in claim 7, wherein each face of the square recess, as viewed in vertical section, is a continuous curve.

9. A screw as claimed in claim 8, wherein each face of the square recess, as viewed in vertical section, is a continuous curve of constant radius.

10. A screw as claimed in claim 7, wherein each face of the square recess comprises an upper planar portion and a lower planar portion which meet along a junction line and adapted for contacting a Robertson type driver.

11. A screw as claimed in claim 10, wherein for each face of the square recess, the upper planar portion is inclined at an angle of 3½ to five degrees to the vertical and the lower planar portion is inclined at an angle of 0.5 to 2 degrees to the vertical.

12. A screw as claimed in claim 7, wherein each face defining a square recess comprises an upper planar portion, an intermediate planar portion and a lower planar portion, the intermediate planar portion extending between the upper and lower planar portions and being at an angle to the vertical which is between the angles to the vertical of the upper and lower planar portions.

13. A screw as claimed in claim 12, wherein the intermediate planar portion of each face is at an angle of 2½ to 3 degrees to the vertical.

14. A screw as claimed in claim 12, wherein each face additionally includes a fourth planar portion extending between the intermediate and lower planar portions.

15. A screw as claimed in claim 14, wherein for each face, the upper planar portion is at an angle of 3½ to 5 degrees to the vertical, the intermediate planar portion is at an angle of 2½ to 3 degrees to the vertical, the fourth planar portion is at an angle of substantially 2 degrees to the vertical, and the lower planar portion is at an angle of 0.5 to 2 degrees to the vertical.

16. A screw as claimed in claim 12, wherein, for each face, the upper planar portion is at an angle to the vertical in the range of 3½ to 3 degrees, and the lower planar portion is at an angle to the vertical of 0.5 to 2 degrees.

17. A screw as claimed in claim 12, wherein the intermediate planar portion extends for substantially 50% of the depth of the square recess.

18. In combination, a screw as claimed in claim 7, and a Robertson type driver of the size associated with that screw for engagement in the square recess.

19. In combination, a screw as claimed in claim 7 and a Phillips type driver of the size associated with the screw for engagement with the cross-slot shaped recess.

20. In combination, a screw as claimed in claims 7 and a Robertson type driver of the size associated with the screw, and a Phillips type driver of the size associated with the screw with either one of said Robertson type driver and said Phillips type driver being engagable with the square recess and the cross-slot shaped recess, respectively.

21. A punch shaped for punching a socket in a screw as claimed in claim 7.

* * * * *

UNITED STATES PATENT AND TRADEMARK OFFICE
CERTIFICATE OF CORRECTION

PATENT NO. : 5,020,954
DATED : 06/04/91
INVENTOR(S) : Geoffrey Dreger

It is certified that error appears in the above-identified patent and that said Letters Patent is hereby corrected as shown below:

ON TITLE PAGE:

[73] Assignee: Isotech Consultants, Inc., 7 Tallforest Crescent, Ontario, Canada Signed and Sealed this Twenty-fourth Day of November, 1992

Attest:

DOUGLAS B. COMER

*Attesting Officer*　　　*Acting Commissioner of Patents and Trademarks*